UNITED STATES PATENT OFFICE.

ARNOLD H. C. HEITMAN, OF DETROIT, MICHIGAN, ASSIGNOR TO PARKE, DAVIS & COMPANY, OF DETROIT, MICHIGAN, A CORPORATION OF MICHIGAN.

AMINOPHENYL ARSENIC COMPOUND.

1,119,279.  Specification of Letters Patent.  Patented Dec. 1, 1914.

No Drawing.  Application filed April 5, 1913.  Serial No. 759,038.

*To all whom it may concern:*

Be it known that I, ARNOLD H. C. HEITMAN, a citizen of the United States, residing in the city of Detroit, county of Wayne, and State of Michigan, have invented certain new and useful Aminophenyl Arsenic Compounds.

I have discovered that aromatic arsenic compounds may be specifics for hog cholera. I have also discovered that when a hydrogen of an amino group in amino-phenyl-arsen-oxid, (which compound has been found very effective in a test tube against certain specific disease organisms, but extremely toxic to the cells of the animal host) is replaced by a carbethoxyl group, $COOC_2H_5$, a compound is obtained which is very much less organo-tropic than its mother substance, while its parasito-tropic or disease destroying property is thereby much enhanced. Examples of this new specific in oxid form are the following: carbethoxy-para-amino-phenyl-arsen-oxid,

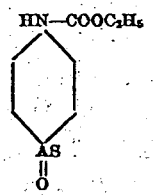

carbethoxy-4-5-diamino-phenyl-arsen-oxid,

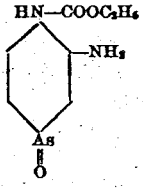

It is presumably true that, founded upon my discoveries, substitutions may be made for other hydrogens in the benzene ring, and that other elements, such as sulfur, selenium or tellurium will be substituted for oxygen in the arsenic radical; such substitutions coming within my generic invention.

In the production of these products I first produced the corresponding penta-valent carbethoxy-p.-amino-phenyl arsenic acids, and then reduce them to the tri-valent arsen oxid. They may also be produced by first reducing the mother substance to the arsen oxid and treating it with ethyl chlor carbonate.

*Production of the acids.*—I produce as follows carbethoxy-para-amino-phenyl arsinic acid:

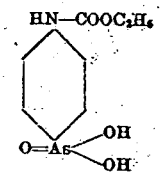

30 grams para-amino-phenyl arseniate of sodium are dissolved in 300 cc. of water containing 4 grams caustic soda. The solution is cooled to about 10° C. and treated with 12 grams of ethyl chlor carbonate, which is added in small portions, thoroughly agitating the mixture after each addition. The free acid is then separated in crystalline form by the addition of dilute hydrochloric acid. From said carbethoxy-para-amino-phenyl arsinic acid I prepare carbethoxy-4-amino-5-nitro-phenyl arsinic acid by nitrating with nitric acid.

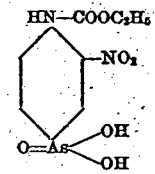

I produce as follows, carbethoxy-4-5-diamino-phenyl arsinic acid

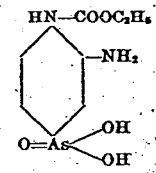

60 grams of barium hydroxid are dissolved in 300 cc. warm water, adding sufficient ammonia water until solution smells quite strongly of ammonia. This mixture is then added to 200 cc. of a solution of 56 grams ferrous sulfate. To this are added 5.8 grams, finely powdered, of said nitro derivative. The mixture is kept at a temperature of about 75° C. and should be well stirred. After 30 minutes the solution is filtered, treated with carbon di-oxid to remove the excess of barium hydroxid and carefully treated with a quantitative amount of 10% sulfuric acid corresponding to the quantity of barium still in the solution. Upon concentrating in vacuum the carbethoxy-4-5-diamino-phenyl arsinic acid separates in long slender needles.

*Production of the oxids.*—First. The carbethoxy-para-amino-phenyl-arsen-oxid may be prepared by the use of sulfurous acid as follows: 300 cc. of an aqueous solution containing 29 grams of a soluble salt (preferably mono-sodium salt) of the carbethoxy-para-amino-phenyl arsinic acid, and 2 grams of potassium iodid, is cooled to 15° C. and acidified with a slight excess of 20% sulfuric acid. This solution is treated with sulfurous acid gas, until it is saturated. It is then carefully made alkaline with an excess of concentrated aqua-ammonia, and the arsen-oxid is precipitated. The substance which is separated out is removed by suction and redissolved in cold dilute caustic soda, the solution filtered and again precipitated with 20% acetic acid. After several hours the product is collected and dried, at ordinary temperature, in a vacuum over sulfuric acid. Second. The carbethoxy-para-amino-phenyl-arsen-oxid may also be prepared by suspending 18 grams of dry finely powdered carbethoxy-para-amino-phenyl arsinic acid, or a salt thereof, in 150 cc. of a non-reacting solvent, such as acetic ether, chloroform or carbon tetra-chlorid. To this suspension 12 grams phosphorus tri-chlorid are added gradually (drop by drop), when a violent reaction follows, the mixture becomes warm and the substance goes into solution. The solution is filtered, the solvent and the formed phosphorus oxy chlorid are removed under reduced pressure. The resulting carbethoxy-para-amino-phenyl-arsen dichlorid residue is treated with dilute caustic soda and stirred until all has dissolved, when the corresponding oxid is precipitated with ammonium chlorid solution or dilute acetic acid. It may be further purified in the usual manner. Third. Or, the carbethoxy-para-amino-phenyl-arsen-oxid may be prepared from para-amino-phenyl-arsen-oxid as follows: 1 molecule of para-amino-phenyl-arsen-oxid is dissolved in 1 molecule of caustic soda and cooled with ice. The mixture is treated with a slight excess of 1 molecule of ethyl chlor-carbonate, adding it in small portions and agitating thoroughly after each addition. After allowing it to stand one hour the product is then precipitated, collected and purified in the usual manner.

The carbethoxy-4.5-diamino-phenyl-arsen-oxid may be prepared in the same manner as said carbethoxy-p-amino-phenyl-arsen-oxid, using carbethoxy-4.5-diamino-phenyl-arsinic acid, with the exception that the final reaction with caustic soda is carried out in more concentrated solution, and that the solution is saturated with carbon-dioxid; evaporated to dryness in vacuum, and the residue extracted with strong alcohol. The carbethoxy-4.5-diamino-phenyl-arsen-oxid is obtained by evaporating the alcohol under reduced pressure. It may be purified by redissolving in alcohol and concentrating the alcoholic solution in vacuum and precipitating with ether.

The carbethoxy-para-amino-phenyl-arsen-oxid has the following characteristics: It appears in the form of a colorless, odorless powder, very soluble in glacial acetic acid, quite soluble in alcohol and in hot water, slightly soluble in water acidulated with hydrochloric acid, and only slightly soluble in cold water. It is insoluble in chloroform, petroleum ether, carbon disulfid, ether and benzol. When heated in dry form to about 270° C. it darkens and is decomposed without previously melting. It dissolves readily in dilute solutions of sodium and potassium hydroxid, from which it is precipitated in amorphous form upon the addition of ammonium chlorid solution, or upon acidulating with acids. However, upon acidulating a dilute alkaline solution of it with acetic acid, especially when warm, the arsen-oxid slowly separates out crystalline in a form containing water of crystallization, and which, under the microscope, appear like oily drops. It does not dissolve in sodium carbonate solution. Dilute alkaline solutions of it treated with hydrogen sulfid yield a yellow substance on acidulating, which may be designated as an arsen-sulfid compound, in which the O in AS=O is replaced with one or more atoms of sulfur. It is a specific for spirochæte and trypanosomes, but is less active toward the cells of the animal host than corresponding substances in which the amino group is not protected by the carbethoxy group.

The carbethoxy-4.5-diamino-phenyl-arsen-oxid appears in the form of a slightly colored amorphous powder, very soluble in glacial acetic acid, quite soluble in alcohol and slightly in water. It is very soluble in acidulated water forming soluble salts. It dissolves very readily in alkaline solution, particularly in caustic, from which it is difficultly precipitated. It was not found to possess a definite melting point. Like the preceding oxid it is generally insoluble in the ordinary organic solvents. It is also a specific for spirochæte and trypanosomes.

The method of treating hog cholera with the foregoing products, respectively, is to suspend about 0.2 grams of the product in some neutral medium, such as olive oil, and inject this suspension hypodermically and intermuscularly into the hog. One injection of this suspension into an animal appears to be sufficient to effect a complete cure, and it also appears to act as a prophylactic against such infection.

I believe that I am the first to discover that an arsenic compound may be a specific for hog cholera, and originate this method of curing that disease. Although my new products are particularly successful in treating hog cholera, they are also specifics for other diseases.

What I claim and desire to secure by Letters Patent of the United States is:

1. As a new specific an aromatic amino arsenic compound in which an amino group is combined with at least one carbethoxy group.

2. As a new specific an aromatic amino arsenic compound containing more than one amino group, in which an amino group is combined with at least one carbethoxy group.

3. As a new specific an aromatic amino arsenic compound containing a 4-carbethoxy-amino group and a 5-amino group.

4. As a new specific an aromatic amino arsenic compound, in which one hydrogen only of an amino group is replaced by a carbethoxy radical.

5. The process of producing an arsenic compound which consists in treating an amino-phenyl-arsinic compound with a carbethoxy compound.

6. The process of producing an arsenic compound which consists in treating an amino-phenyl-arsenic compound with a carbethoxy compound, then nitrating and then reducing the nitro group to the amino form.

In testimony whereof I have hereunto signed my name in the presence of two subscribing witnesses.

ARNOLD H. C. HEITMAN.

Witnesses:
W. W. FISHER,
C. G. JOHR.